March 29, 1938. H. C. FRENTZEL, JR 2,112,458
POWER TRANSMITTING MECHANISM
Filed Sept. 3, 1936 3 Sheets-Sheet 3

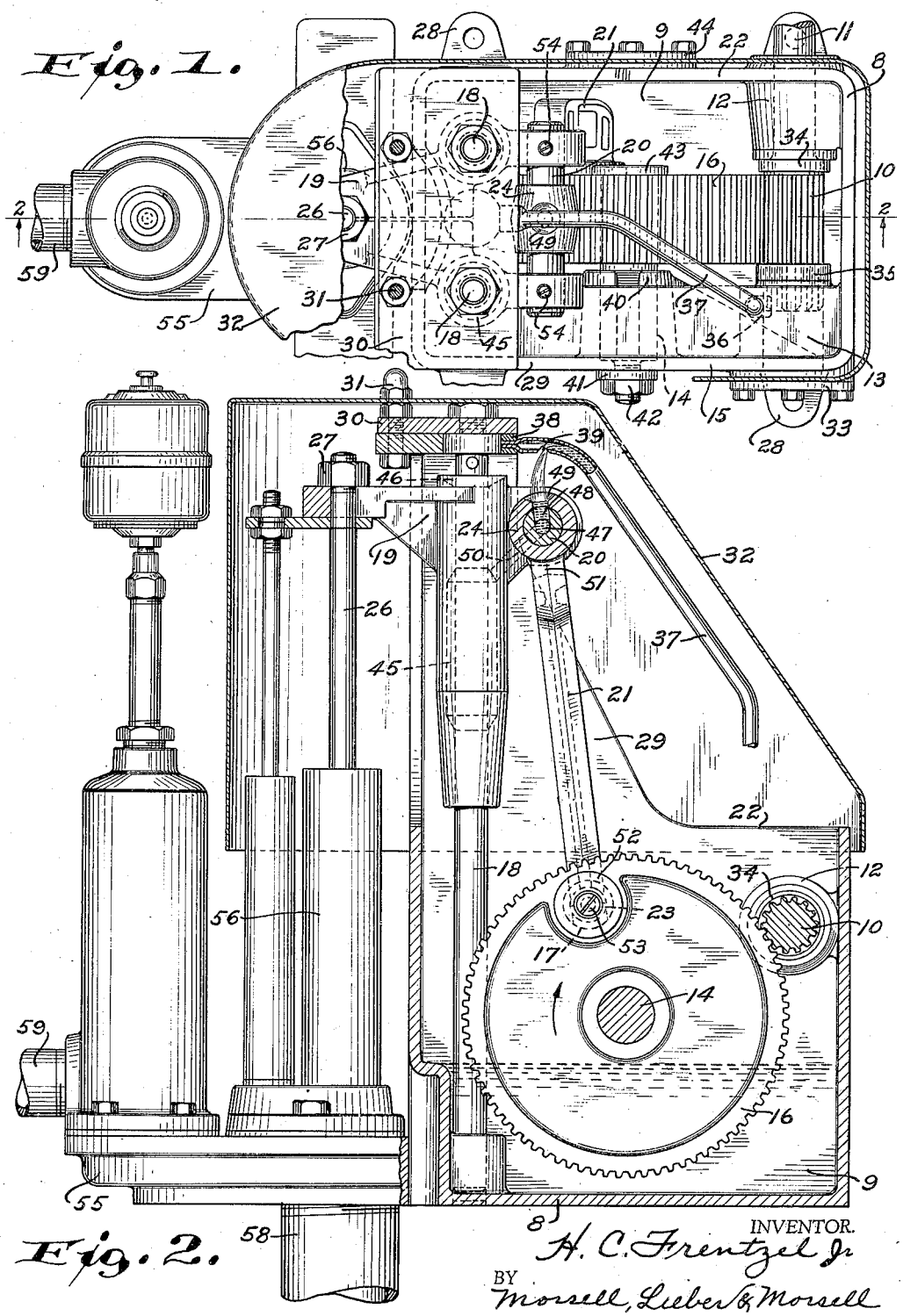

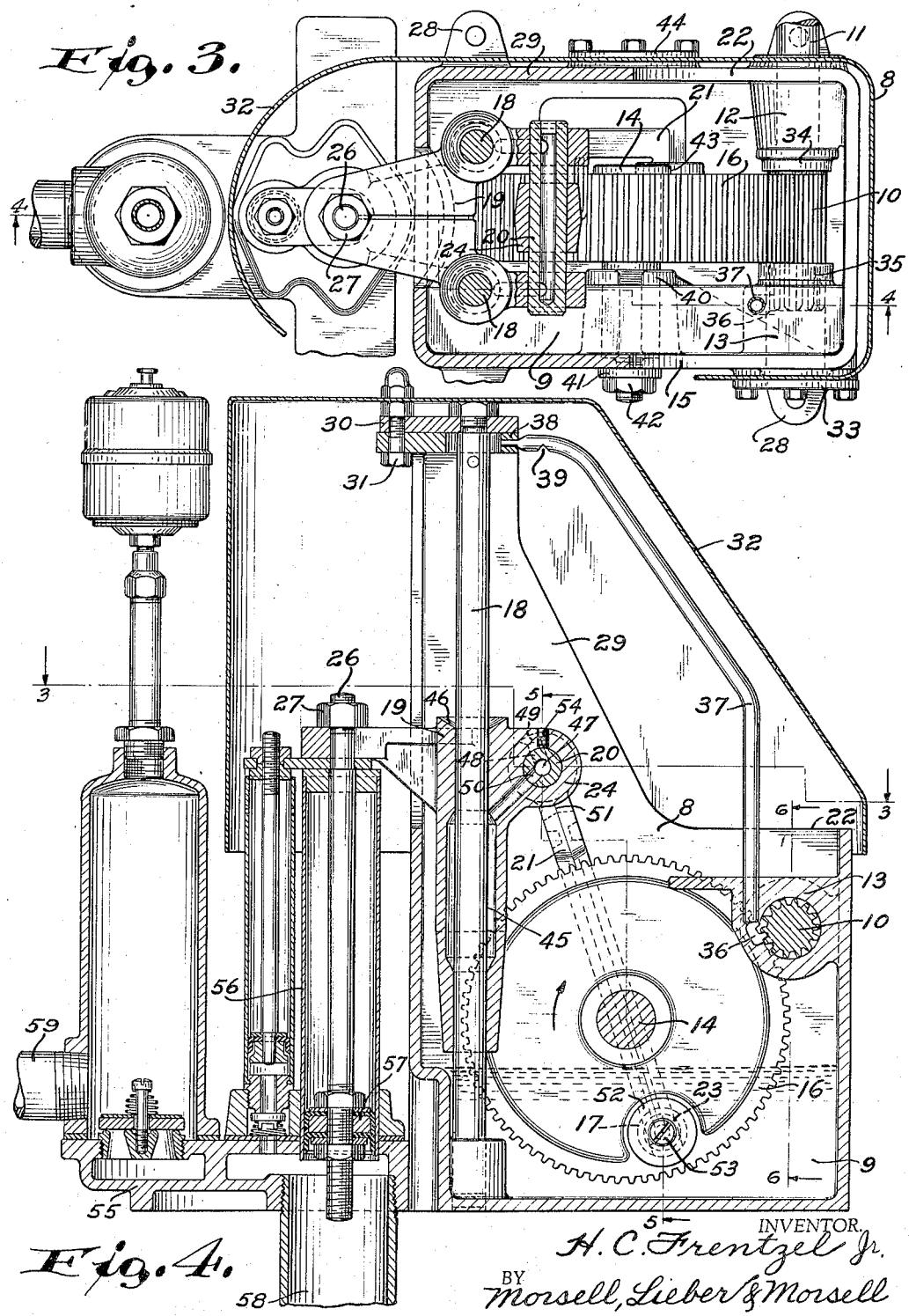

INVENTOR
H. C. Frentzel Jr.
BY Morsell, Lieber & Morsell
ATTORNEYS.

Patented Mar. 29, 1938

2,112,458

UNITED STATES PATENT OFFICE 2,112,458

POWER TRANSMITTING MECHANISM

Herman C. Frentzel, Jr., Milwaukee, Wis., assignor to The Heil Co., Milwaukee, Wis., a corporation of Wisconsin Application September 3, 1936, Serial No. 99,185

13 Claims. (Cl. 74—44)

The present invention relates to improvements in the construction and operation of power transmitting mechanism which is especially adapted to convert rotary motion into reciprocating motion, and relates more specifically to power units for driving reciprocable deep well pumps or the like.

An object of the invention is to provide improved well lubricated power transmitting mechanism which is simple, compact and durable in construction, and which is also highly efficient in operation.

It has long been common practice in the deep well pumping art, to utilize a so-called power head for converting the rotary motion at the source of power, into vertical reciprocatory motion at the pump plunger; and the type of power head heretofore commonly used for this purpose comprises in general a pinion driven from the power source and meshing with a main gear which carries a crank pin, a cross-head reciprocable upon fixed parallel guides and adapted for adjustable attachment directly to the plunger rod of the pump, and a pitman or rod connecting the crank pin with a wrist pin carried by the cross-head. The pinion, gear, cross-head, guides and connecting rod of the power head assemblage, are ordinarily mounted for movement within a casing forming a lubricant receptacle, and various contrivances for distributing lubricant from the receptacle to the various bearings of the mechanism have heretofore been proposed, but none of these are entirely satisfactory. The prior power heads are moreover too complicated and are not sufficiently well lubricated and durable to withstand continuous and severe usage, thus making at least some of these prior power heads relatively unreliable in operation. Others of the prior power heads cannot be readily assembled and dismantled, thus making the parts relatively inaccessible for inspection and replacement, and none of these prior power transmitting mechanisms are sufficiently reliable to insure efficient operation without considerable attention.

It is, therefore, a more specific object of the present invention to provide an improved power head or unit which obviates all of these prior objectionable features, and wherein the relatively few but durable working parts are readily accessible and removable and are automatically abundantly lubricated whenever the assemblage is operating.

Another specific object of my present invention is to provide an improved power head having a single set of transmission gears comprising a sturdy pinion meshing with a massive main gear, and an improved connecting rod for most effectively transmitting motion from the main gear to a properly guided cross head, all of these elements being provided with ample and well lubricated bearings which are relieved from undesirable stresses.

A further specific object of my invention is the provision of a new and useful power transmitting mechanism for converting rotary motion into reciprocating motion, all parts of which are automatically and abundantly lubricated whenever the mechanism is placed in operation, and which requires no attention whatever for long periods of time.

Still another specific object of the invention is to provide a sturdy power transmission unit especially applicable for the purpose of driving deep-well pumps, which may be readily assembled or dismantled, and which may also be installed and operated at minimum cost.

These and other specific objects and advantages will be apparent from the following detailed description.

A clear conception of embodiments of the several improved features, and of the mode of constructing and of operating power heads built in accordance with the invention, may be had by referring to the drawings accompanying and forming a part of this specification wherein like reference characters designate the same or similar parts in the various views.

Fig. 1 is a top view of one of the improved pumping units with a portion of the cover of the power head broken away to reveal normally enclosed parts;

Fig. 2 is a central vertical longitudinal section through the power head and a side elevation of the pumping mechanism which is operable thereby, showing the cross-head in uppermost position;

Fig. 3 is a horizontal section through the power transmission unit taken along the irregular line 3—3 of Fig. 4, and also shows a top view of the pumping mechanism;

Fig. 4 is a longitudinal vertical section through the pump and power head taken along the irregular line 4—4 of Fig. 3, showing the cross-head in lowermost position;

Figure 5:
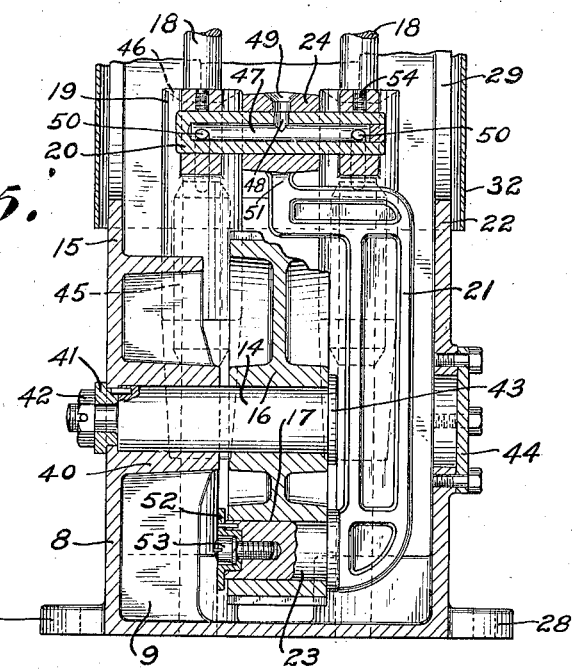
Fig. 5 is a fragmentary transverse vertical section through the power head taken along the irregular line 5—5 of Fig. 4.

Although the invention has been shown and described herein as being specifically embodied in a power head for deep well pumping units, it is not the intent to thereby unnecessarily restrict the scope, since some of the novel features may obviously be more generally applied to other types of motion transmitting mechanisms for other uses.

Referring to the drawings, the improved power head constituting my present invention, comprises in general a main box-like casing 8 forming a relatively deep lubricant receptacle 9; a pinion 10 formed integral with a shaft 11 which is rotatably supported in bearings 12, 13 associated with the upper rear end of the casing 8; a removable normally stationary stub shaft or journal pin 14 secured to one side wall 15 of the casing 8 and extending into the casing near the upper portion of the receptacle 9; a main gear 16 rotatably supported upon the pin 14 and meshing with the pinion 10, the gear 16 having an eccentric bore 17 which is revolvable through the basin 9 about the axis of the stub shaft; spaced rods forming parallel vertical guides 18 rigidly secured to the forward portion of the casing 8; a cross-head 19 reciprocable along the guides 18 and having a wrist pin 20 provided with a bearing portion movable in the vertical plane of rotation of the main gear 16; and a U-shaped connecting rod 21 movable in the space between the main gear 16 and the opposite side wall 22 of the casing 8, and having a crank pin 23 at one end cooperable with the eccentric bore 17 and a bored opposite end 24 embracing the central bearing portion of the wrist pin 20. The pinion driving shaft 11 may have its reduced end projecting outwardly beyond either side wall 15, 22 of the casing 8 and provided with a pulley 25 or other means for imparting rotary motion to the pinion 10; and the cross-head 19 may be directly connected to any reciprocable driven mechanism such as a pump plunger rod 26 located forwardly of the casing 8, by means of a nut 27 or the like.

The main casing 8 may be formed by casting or of welded sheet metal, and is provided with attaching lugs 28 at the bottom thereof while the upper portion of the front wall and the forward portions of the side walls 15, 22 have integral upwardly extending projections 29 to which a supporting plate 30 for the upper ends of the rod guides 18 is attached by means of bolts 31. The bolts 31 also serve as means for detachably retaining a relatively light cover 32 in position over the casing 8 and the pumping mechanism; and the upper ends of the guides 18 are rigidly attached to both the projections 29 and plate 30, while the lower ends thereof are snugly fitted within sockets in the lower portion of the casing 8 so as to maintain the guides parallel to each other. The casing 8 must be oil tight and the basin 9 may be filled with oil to any desired level so as to insure an abundant supply of lubricant at all times.

Figure 6:
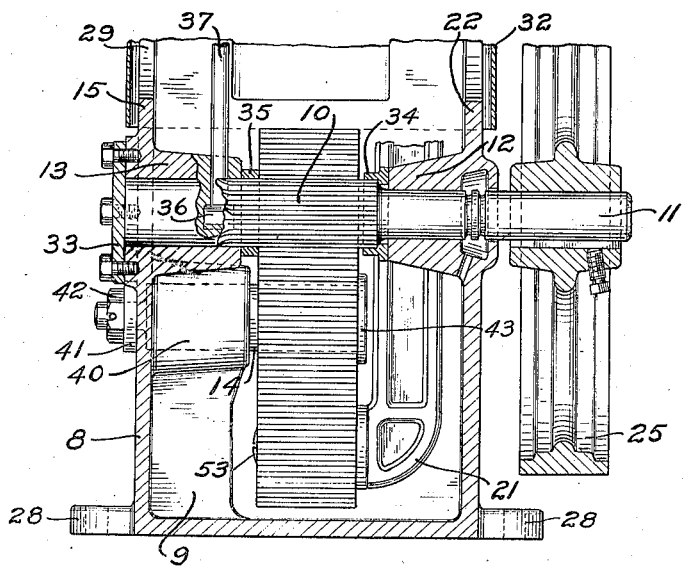
Fig. 6 is another fragmentary transverse vertical section through the power transmitting mechanism, taken along the line 6—6 of Fig. 4.

As previously indicated, the pinion 10 may be formed integral with its driving and supporting shaft 11, and the driving end of the shaft 11 to which the pulley 25 is directly attached and which coacts with the bearing 12 supported by the casing side wall 22, is preferably of considerably reduced diameter; whereas the opposite shaft end which coacts with the bearing 13 carried by the casing wall 15 preferably has a diameter substantially equal to or larger than that of the pinion periphery. When the pulley 25 is removed, the shaft 11 may be longitudinally inserted within or withdrawn from the bearings 12, 13 upon removal of the thrust bearing and retainer plate 33 which normally holds the shaft 11 against endwise displacement, and it is to be noted from Figs. 1 and 6, that the teeth of the pinion 10 extend along the shaft 11 considerably beyond the side of the main gear 16 and into the bearing 13. Rings 34, 35 snugly embrace the pinion 10 between the ends of the bearings 12, 13 respectively and the adjacent sides of the gear 16, and the interior of the bearing 13 is provided with a lubricant receiving pocket 36 which is always in open communication with the extended pinion teeth and the lower portion of which terminates at the point of deepest mesh of the gear and pinion teeth, see Fig. 4. A lubricant conducting pipe 37 which communicates with the top of the pocket 36, extends from the bearing 13 to the central portion of a cross-brace 38 formed integral with and connecting the upper ends of the casing projections 29, and the upper extremity of the pipe 37 is closed while the pipe is provided with a downwardly directed lubricant dispensing opening 39 slightly removed from its extreme upper end.

The gear supporting journal pin 14 is snugly fitted within a bore formed in a hub 40 formed integral with the casing side wall 15 as clearly shown in Fig. 5, being normally held in fixed oil-tight position by means of a clamping collar 41 and a lock nut 42; and the main gear 16 is definitely positioned for rotation about the pin axis in a fixed vertical plane, by means of a head or flange 43 at the free end of the pin 14 as well as by the pinion collars or rings 34, 35 which coact with the opposite side faces of the gear. The journal pin 14 is axially removable from or insertable within the bore of the casing hub 40 upon removal of the collar 41 and nut 42, through an opening in the casing wall 22 which is normally sealed by a closure plate 44; and when the main gear 16 is being rotated by the pinion 10, the gear teeth travel through the lubricant in the basin 9 and constantly carry an abundant supply of this lubricant up to the pinion.

It has heretofore been pointed out that the guides 18 are normally rigidly held in parallel vertical position near the front portion of the casing 8, and that the cross-head 19 is normally slidable along the guides 18. The cross-head 19 is split at the top as clearly shown in Figs. 1 to 4, and has two elongated guide hubs each of which is bored to slidingly engage one of the guides 18, and the interior of each of these hubs is provided with a lubricant confining chamber 45 and with an upper lubricant retaining recess 46 as illustrated in Figs. 3 and 4. The horizontal wrist pin 20 which is carried by the cross-head 19 and spans the vertical plane of rotation of the main gear 16, but which may also be formed integral with the upper end of the connecting rod 21, has an internal conduit 47 the ends of which are sealed; but the medial portion of which communicates through passages 48 with a recess 49 formed in the pin engaging end 24 of the connecting rod 21 as depicted in Figs. 2 and 5, and the recess 49 is guided by the rods 18 to travel vertically beneath the lubricant dispensing opening 39 of the pipe 37. The wrist pin 20 is also provided with outlet openings 50 near its sealed ends, which communicate directly with the chambers 45 formed within the cross-head 19, so that any lubricant admitted to the conduit 47 through the passages 48 will be dispensed through the outlet openings 50 to the chambers 45 thereby insuring effective lubrication of the cross-head bearing and guiding surfaces.

The U-shaped connecting rod 21 which is normally movable within the unobstructed space within the casing 8 between the headed end of the pin 14 and the casing side wall 22, may be formed in any convenient manner and has a relatively resilient portion 51 of considerably reduced cross-sectional area connecting the wrist-pin engaging end 24 with the body of the rod 21. The crank pin 23 which coacts with the eccentric bore 17 of the main gear 16, may be formed integral with the lower end of the connecting rod 21 and is normally maintained within the bore 17 by a retainer cap 52 and a set screw 53 as shown in Fig. 5, and this crank pin 23 normally dips into the lubricant receptacle 9 during each revolution of the main gear 16 and is thus abundantly lubricated. The wrist pin 20 is locked in position within the cross-head 19 by means of set screws 54, and the connecting rod 21 may obviously be detached from the cross-head 19 upon release of the screws 54 and endwise withdrawal of the pin 20, and may be likewise disconnected from the main gear 16 by removing the cap 52 and screw 53. It is to be noted, that the provision of the relatively flexible or resilient rod portion 51, relieves the guides 18, wrist pin 20, crank pin 23 and the main gear bearing from excessive strain due to slight misalinement of the elements, and the U-shaped formation of the connecting rod enables effective transmission and conversion of the rotary motion of the main gear 16 into reciprocating motion at the cross-head 19 in the plane of rotation of the gear 16 without subjecting the bearings to undesirable stresses.

While the deep well pump may obviously be replaced by any other reciprocatory mechanism, this pump may be supported upon a base plate 55 which supports a cylinder 56 within which the piston 57 carried by the piston rod 26, is reciprocable. The pump is also provided with the usual suction pipe 58 and discharge line 59 associated with the base plate 55, and the other elements of the pumping mechanism are also well known in the art and form no specific part of the present improvement.

When the power unit has been properly assembled, adjusted and supplied with lubricant, rotary motion may be imparted to the pinion driving shaft 11 from any suitable source, through the pulley 25, thereby causing the gear 16 to rotate at a slower rate of speed about the axis of the journal pin 14. The rotary motion of the main gear 16 is transmitted through the crank pin 23 to the connecting rod 21 which in turn imparts reciprocatory motion to the cross-head 19 through the wrist pin 20. The cross-head 19 is thus moved up and down along the guides 18 and this reciprocating motion is imparted to the pump piston rod 26 in an obvious manner. The U-shaped single connecting rod 21 by virtue of its formation and coaction with the wrist pin 20, and with the main gear 16 in the vertical plane of rotation of the latter, will obviously convert the rotary motion of the gear into reciprocating motion of the cross-head without producing lateral pressure on the gear 16, and the reduced flexible portion 51 of the connecting rod 21 will compensate for any slight misalinement of the guides 18 and cross-head bores thereby further relieving the mechanism from stresses.

As the gear 16 revolves, it is prevented from shifting laterally by the pin 14 and the collars or rings 34, 35, and the teeth of this gear constantly pick up abundant quantities of lubricant as they pass through the basin 9. When the oil-laden gear teeth engage the teeth of the pinion 10, the lubricant is pressed laterally away from the zone of intermesh and travels along the surfaces of the bearings 12, 13 through the rings 34, 35, this action being clearly apparent from Fig. 6. Because the pinion teeth extend up to the confined oil pocket 36 of the bearing 13, larger quantities of the oil will be pumped into this pocket, and this lubricant will be forced through the pipe 37 and discharged through the opening 39 at the upper end thereof. The lubricant thus constantly discharged from the opening 39 is deposited by gravity upon the upper connecting rod end 24, where a considerable quantity of the oil enters the conduit 47 within the wrist pin 20 through the reservoir 49 and passages 48 as illustrated in Fig. 2. The excess oil which fails to enter the conduit 47 returns to the reservoir 9 along the connecting rod 21, cross-head 19 and guides 18, and the oil from within the conduit 47 flows through the passages 50 into the cross-head lubricating chambers 45 where it is dispersed along the guides 18 and eventually returns to the reservoir 9 for re-circulation. The reservoirs 46 catch and retain some of this oil above the cross-head 19, and the crank pin 23 is abundantly lubricated by oil which flows downwardly along the connecting rod and when it passes directly through the main reservoir 9. The pin 14 is also abundantly lubricated by excess oil carried upwardly by the gear 16 and connecting rod 21, thus insuring abundant, constant and automatic lubrication of all of the bearings whenever the mechanism is placed in operation.

The removable cover 32 normally protects the elements of the power head and the oil reservoir 9 against entry of dirt, and also prevents loss of oil due to splashing, but this cover may be readily removed in order to gain access to the motion transmitting and pumping mechanisms. Upon removal of the cover 32, all of the elements are freely accessible for inspection and removal, or for replacement or addition of oil. The cross-head 19 may be removed by merely withdrawing the guides 18 after releasing the upper ends thereof. The connecting rod 21 is removable upon withdrawal of the wrist pin 20 and removal of the screw 53 and cap 52, and the main gear 16 may be withdrawn upon removal of the supporting pin 14 through the opening in the casing wall 22 which is normally sealed by the plate 44. The pinion 10 may also be readily removed upon removal of the pulley 25 and the plate 33, thus providing for ready removal of parts and assembly of the mechanism.

From the foregoing detailed description it will be apparent that the present invention provides an improved power transmitting mechanism which is simple, compact and durable in construction, and which is moreover highly efficient in operation. All parts of the improved assemblage are effectively protected and abundantly lubricated during normal use, and the several elements are readily accessible for inspection. The lubricating system functions automatically to effectively distribute and circulate the oil, and the mechanism may be conveniently assembled or dismantled. The U-shaped formation of the connecting rod 21 is important since the bearings at the pins 20, 23 are disposed in the plane of rotation of the main gear 16 and are thus relieved from overhanging or eccentric loading and resultant stresses, and the split construction of the cross-head 19 is also important since it compensates for slight mis-alinement of the guide rods 18 by permitting slight relative movement of the rod engaging hubs relative to each other. The resilient connecting rod portion 51 also functions to relieve stresses resulting from slight mis-alinement of parts; and the location of the pocket 36 in the bearing 13 with its lower end terminating at the point of deepest mesh of the gears, prevents the oil from being withdrawn as the teeth pass this point of deepest mesh. The various parts of the assemblage may be readily constructed, and the power head may obviously be manufactured and operated at moderate cost and requires minimum attention while in normal use.

It should be understood that it is not desired to limit the present invention to the exact details of construction and to the precise mode of operation herein shown and described, for various modifications within the scope of the claims may occur to persons skilled in the art.

I claim:

1. In combination, a casing forming a lubricant receptacle, a pinion rotatably supported by said casing, a main gear meshing with said pinion and journaled in said casing so as to extend into said receptacle, said main gear having an eccentric crank bearing, spaced guides secured to said casing, a slide movable along said guides and having an actuating bearing disposed in the plane of rotation of said main gear, and a connecting rod having its opposite ends cooperable respectively with said crank and with said slide actuating bearings.

2. In combination, a casing forming a lubricant receptacle, a pinion journaled in said casing, a main gear meshing with said pinion and journaled in said casing so as to operate within said receptacle, said main gear having an eccentric bearing bore movable through said receptacle, spaced vertical guides secured to said casing, a slide movable along said guides and having an actuating pin provided with a bearing portion disposed in the plane of rotation of said main gear, and a connecting rod having a pin at one end coacting with said eccentric bore and having a bore at its opposite offset end embracing said pin bearing portion.

3. In combination, a casing forming a lubricant receptacle, a pinion supported by said casing, a main gear centrally journaled upon one of the inner sides of said casing and having an eccentric crank bearing movable through said basin, a cross-head having a journal pin provided with a bearing portion movable in the plane of rotation of said main gear, and a connecting rod disposed laterally adjacent said gear at the opposite inner side of said casing, said connecting rod having one end cooperable with said eccentric crank bearing and having its opposite end offset and drivingly cooperable with said journal pin bearing portion.

4. In combination, a casing forming a lubricant receptacle, a pinion journaled in said casing, a main gear centrally supported from one side of said casing and having an eccentric bore movable through said basin, a cross-head having a journal pin provided with a bearing portion movable in the plane of rotation of said main gear, and a connecting rod disposed between said main gear and the opposite side of said casing, said connecting rod having a pin at one end provided with a bearing portion coacting with said eccentric bore and having a bore at its opposite end embracing said journal pin bearing portion.

5. In combination, a casing forming a lubricant receptacle, a pinion journaled in the upper portion of one end of said casing, one side of said casing having a journal pin projecting over said receptacle, a main gear centrally supported upon said journal pin and meshing with said pinion, said gear having an eccentric bore movable about said pin and through said basin in the plane of rotation of the gear, a vertical guide associated with the opposite end of said casing, a cross-head movable along said guide and having an actuating bearing reciprocable in the plane of rotation of said gear, and a connecting rod disposed in the space between said gear and the opposite side of said casing and having its opposite ends operatively connected with said eccentric bore and said cross-head bearing and the intervening portion thereof located laterally of said gear.

6. In combination, a casing forming a lubricant receptacle, a pinion journaled in said casing, a journal pin extending into said casing from one wall thereof and having its inner end spaced from the opposite casing wall, a main gear rotatably supported upon said pin and meshing with said pinion, a cross-head having a wrist pin provided with a bearing portion movable in said casing in the plane of rotation of said main gear, and a U-shaped connecting rod movable in said casing in the space between the inner end of said journal pin and said opposite casing wall, said connecting rod having one end provided with an offset crank pin coacting with said main gear and having an offset opposite end embracing said wrist pin bearing portion.

7. In combination, a casing forming a lubricant receptacle, a pinion journaled in said casing, a main gear meshing with said pinion and being journaled on one side wall of said casing and spaced from the opposite side wall thereof, a cross-head having a wrist pin provided with a bearing reciprocable in the plane of rotation of said main gear, and a U-shaped connecting rod having a main body movable in the space between said main gear and said opposite casing side wall and having offset end bearing portions coacting with said wrist pin bearing and with said gear in the plane of rotation of the latter, said rod having a portion of considerably reduced cross-sectional area between one of said end bearing portions and the main body of the rod.

8. In combination, a casing forming a lubricant receptacle, a pinion journaled in said casing, a main gear meshing with said pinion and being journaled on one side wall of said casing and spaced from the opposite side wall thereof, a cross-head having a wrist pin provided with a bearing reciprocable in the plane of rotation of said main gear, and a U-shaped connecting rod having a main body movable in the space between said main gear and said opposite casing side wall and having offset end bearing portions coacting with said wrist pin bearing and with said gear in the plane of rotation of the latter, said rod having a flexible reduced portion located in the plane of rotation of said main gear and between said wrist pin engaging end and the main body of the rod.

9. In combination, a casing forming a receptacle, a pinion journaled in said casing, a main gear meshing with said pinion within said casing and being spaced laterally from one side wall of the casing, a cross-head having an actuating bearing portion movable in the plane of rotation of said main gear, and a connecting rod having a main body movable through the space between said main gear and said casing side wall and having end bearing portions coacting with said gear and with said cross-head actuating portion in the plane of rotation of the gear, said connecting rod having a relatively flexible portion intermediate said end bearing portions for relieving the latter from stress due to misalinement of parts.

10. In combination, a casing forming a lubricant receptacle, a pinion and gear operable within said casing, a connecting rod operable by said gear, spaced guides mounted in said casing, and a split cross-head operable by said connecting rod and having relatively laterally movable hub portions slidable along said guides.

11. In combination, a casing forming a lubricant receptacle, a pinion and gear operable within said casing, a connecting rod operable by said gear, substantially parallel vertical guide rods mounted in said casing and a split cross-head operable by said connecting rod and having relatively laterally movable hub portions slidable along said guides.

12. In combination, a casing forming a lubricant receptacle, a pinion and gear enclosed withing said casing, a connecting rod operable by said gear, spaced guide rods mounted within said casing, and a one-piece centrally split cross-head operable by said connecting rod and having relatively laterally movable hub portions on opposite sides of the split slidable along said guides.

13. In combination, a casing forming a lubricant receptacle, a main gear journaled on one side wall of said casing and spaced from the opposite side wall thereof, a cross-head having a wrist pin provided with a bearing reciprocable in the plane of rotation of said main gear, and a U-shaped connecting rod having a main body movable in the space between said main gear and said opposite casing side wall and having offset end bearing portions coacting with said wrist pin bearing and with said gear in the plane of rotation of the latter, said rod having a flexible reduced portion located in the plane of rotation of said main gear and between said wrist pin engaging end and the main body of the rod.

HERMAN C. FRENTZEL, Jr.